United States Patent
Fayt et al.

(10) Patent No.: US 7,150,495 B2
(45) Date of Patent: Dec. 19, 2006

(54) USE OF A FENDER AND A HOOD IN COMBINATION WITH AN AIR BAG, FENDER RETAINING AND SUPPORT MEANS, A FENDER, A FENDER MODULE, AND A HOOD FOR A MOTOR VEHICLE

(75) Inventors: Arnold Fayt, Jujurieux (FR); Laurent Rocheblave, Brignais (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 10/936,219

(22) Filed: Sep. 8, 2004

(65) Prior Publication Data
US 2005/0140174 A1    Jun. 30, 2005

(30) Foreign Application Priority Data
Sep. 9, 2003    (FR)    ................... 03 10633

(51) Int. Cl.
*B60J 7/00*    (2006.01)
(52) U.S. Cl. .................... 296/187.02; 180/274
(58) Field of Classification Search ........... 296/187.02, 296/198, 193.11
See application file for complete search history.

(56) References Cited
U.S. PATENT DOCUMENTS

| | | | | |
|---|---|---|---|---|
| 4,015,870 A | * | 4/1977 | Stcherbatcheff et al. ...... | 293/32 |
| 6,182,782 B1 | * | 2/2001 | Matsuura et al. ........... | 180/274 |
| 6,474,679 B1 | * | 11/2002 | Miyasaka et al. ...... | 296/187.05 |
| 6,637,788 B1 | * | 10/2003 | Zollner et al. ............... | 293/107 |
| 6,827,170 B1 | * | 12/2004 | Hamada et al. ............. | 180/274 |
| 6,920,954 B1 | * | 7/2005 | Hashimoto et al. ......... | 180/274 |
| 6,938,715 B1 | * | 9/2005 | Hamada et al. ............. | 180/274 |
| 2002/0171262 A1 | | 11/2002 | Ozawa | |
| 2005/0206139 A1 | * | 9/2005 | Mori et al. ............... | 280/730.1 |

FOREIGN PATENT DOCUMENTS

| | | | |
|---|---|---|---|
| DE | 19948181 A1 | * | 4/2001 |
| DE | 10014832 A1 | | 10/2001 |
| DE | 10022094 | | 8/2002 |
| JP | 08091170 A | * | 4/1996 |
| JP | 2000264146 A | * | 9/2000 |
| JP | 2001334895 A | * | 12/2001 |
| JP | 2003252141 A | * | 9/2003 |
| JP | 2003327064 A | * | 11/2003 |
| JP | 2004090795 A | * | 3/2004 |

\* cited by examiner

*Primary Examiner*—Kiran B. Patel
(74) *Attorney, Agent, or Firm*—James R. Williams

(57) ABSTRACT

The present invention relates to the use, at the front of a motor vehicle, of a fender and of a hood defining a fender-hood junction leaving predetermined clearance between an edge of the hood and an edge of the fender, in combination with an air bag for deploying to the outside of the vehicle. This use is performed in such a manner that while the air bag is deploying, it deforms the fender and/or the hood in such as a manner as to enlarge the clearance and create a passage between the edge of the hood and the edge of the fender. The invention also relates to retaining means and to a fender support, to a fender, to a fender module, and to a hood for a motor vehicle.

5 Claims, 4 Drawing Sheets

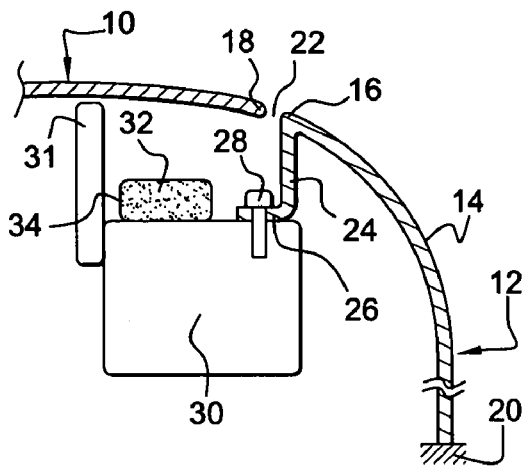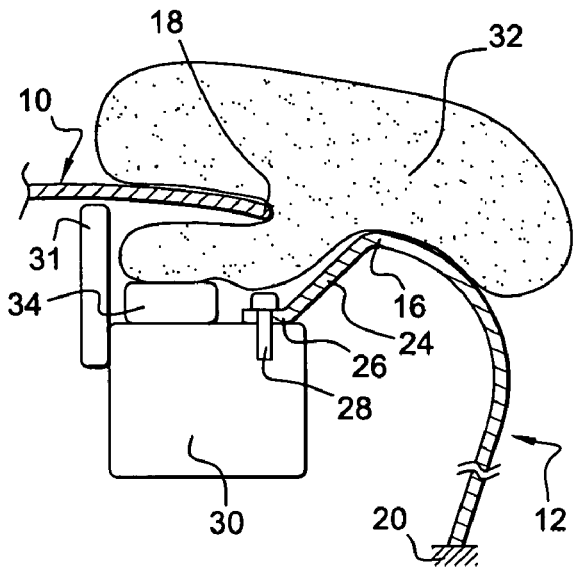
Fig. 1  Fig. 2
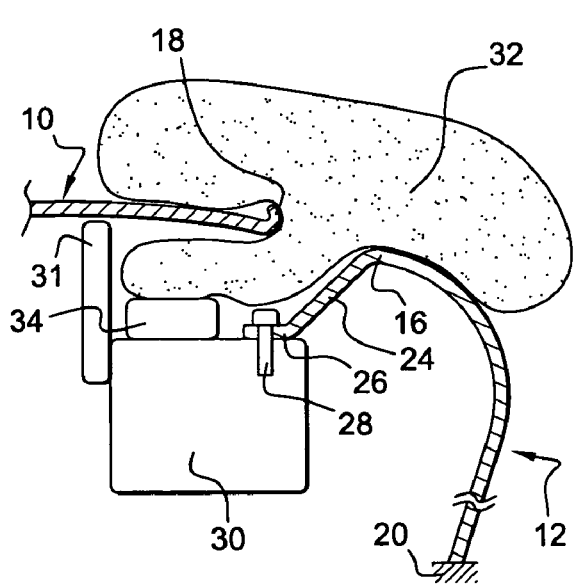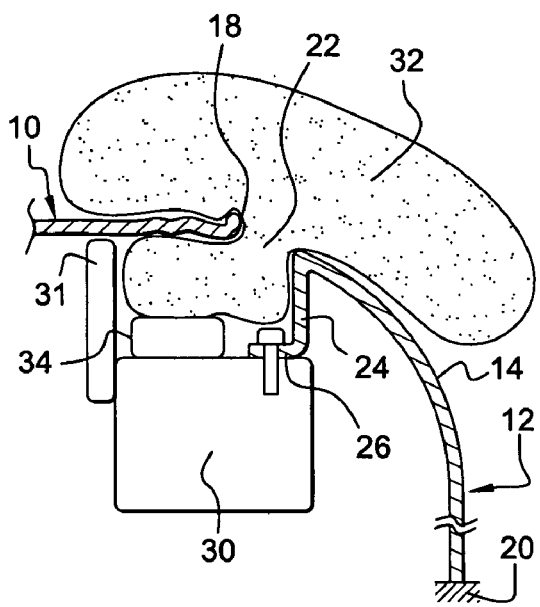
Fig. 3  Fig. 4

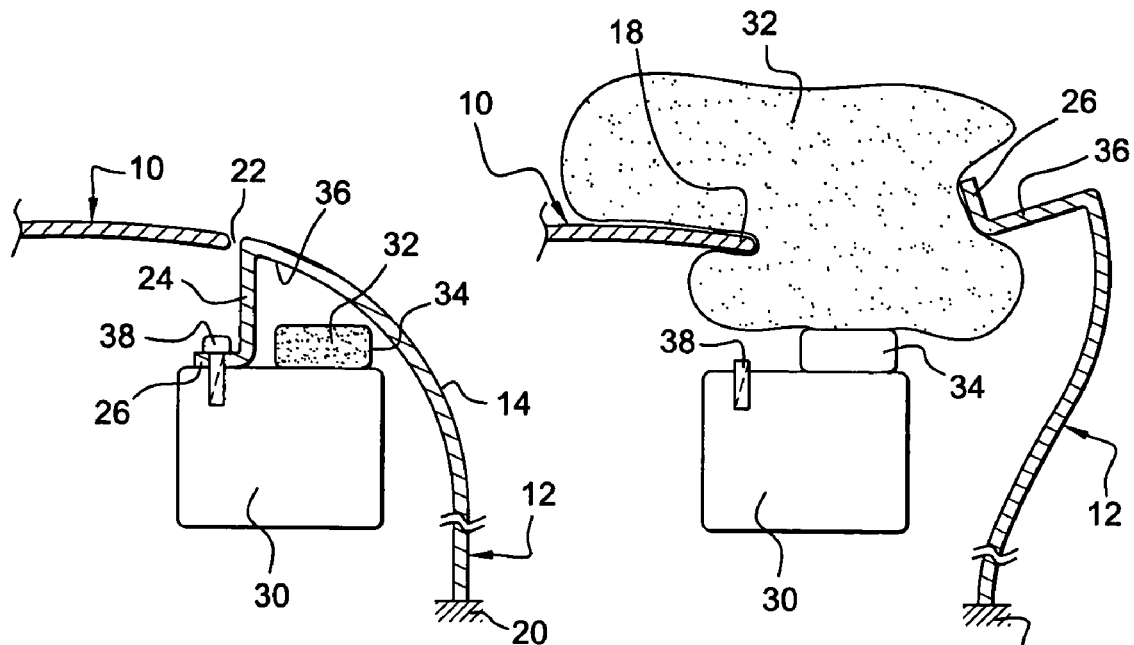
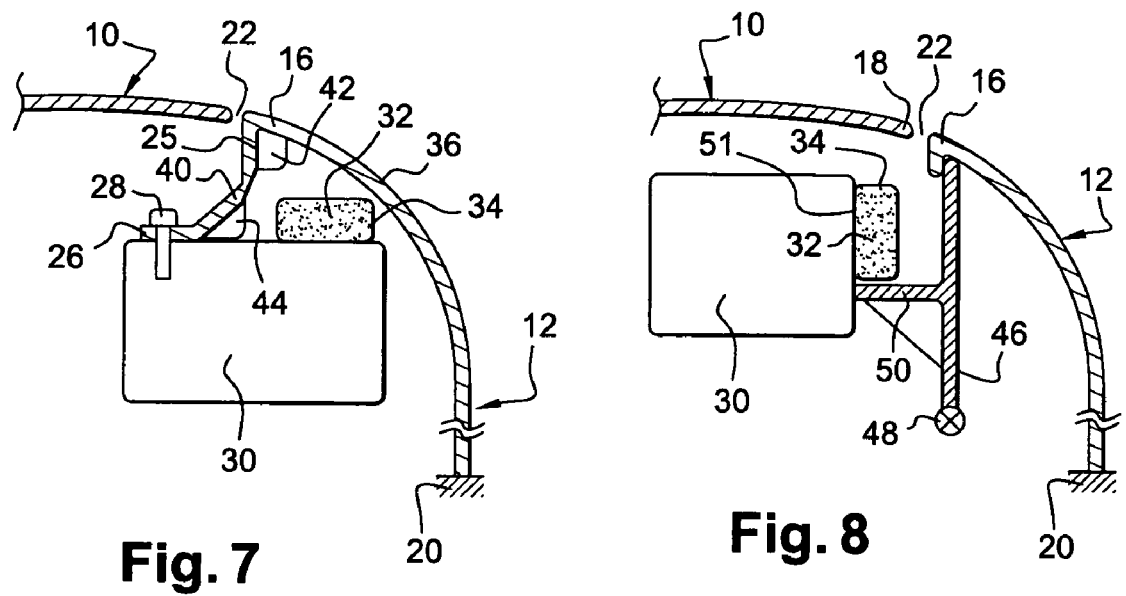

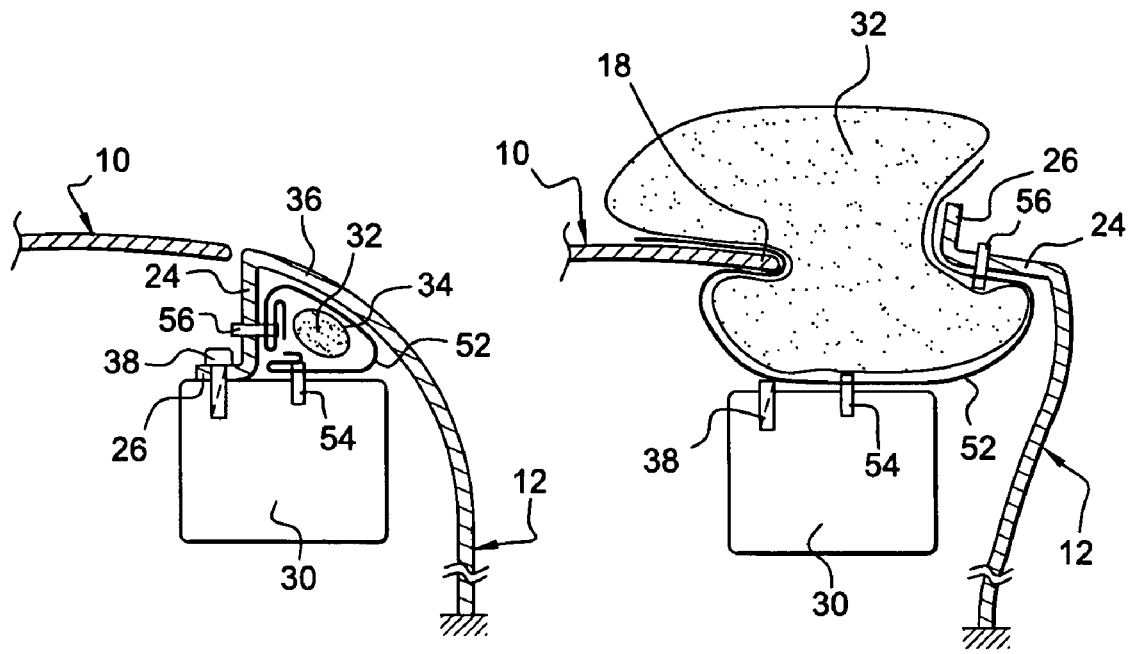
Fig. 9   Fig. 10
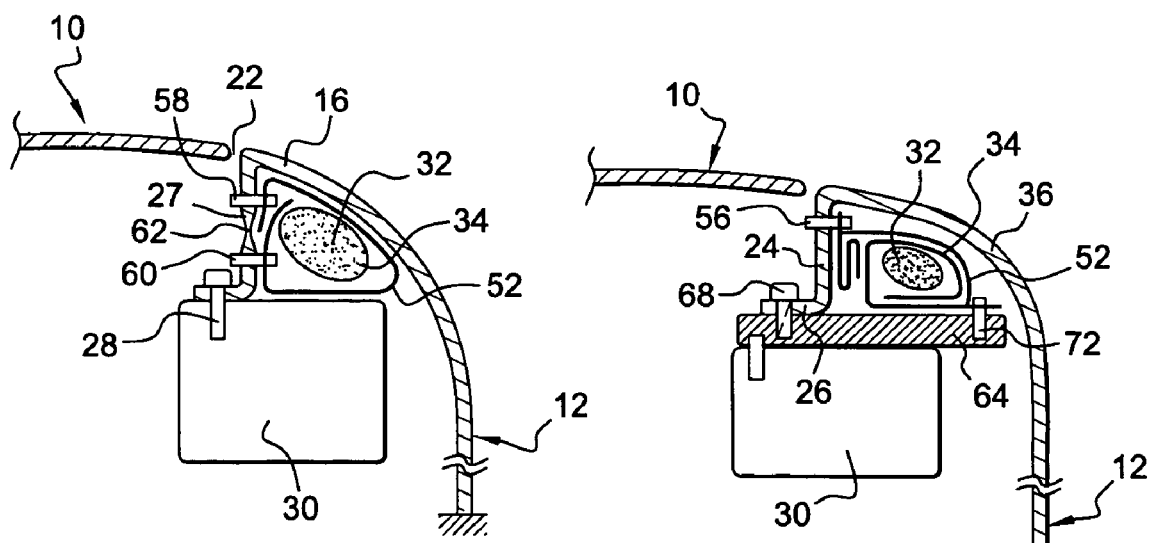
Fig. 11   Fig. 12

USE OF A FENDER AND A HOOD IN COMBINATION WITH AN AIR BAG, FENDER RETAINING AND SUPPORT MEANS, A FENDER, A FENDER MODULE, AND A HOOD FOR A MOTOR VEHICLE

The present invention relates to the use of a fender and a hood in combination with an air bag, to fender retaining and support means, to a fender, to a fender module, and to a hood for a motor vehicle.

BACKGROUND OF THE INVENTION

Vehicle manufacturers are seeking to provide their vehicles with systems for protecting pedestrians. For example, air bags are already known that are designed to deploy outwards from the vehicle in order to cover zones that are too rigid, such as the junction between the hood and the windshield, in order to damp a possible impact against a pedestrian.

Amongst the zones which are rigid and therefore dangerous for pedestrians, there is also the junction between the hood and a fender which is relatively stiff because of the juxtaposed edges of the hood and of the fender.

In order to protect this fender/hood zone, the state of the art, and in particular DE 19948181, discloses devices which deploy all along the join to be covered, in the event of an impact being detected.

The problem of such devices protecting the junction between the hood and the fender consists in that they deploy on a very restricted and locatd surface.

Also known in the state of the art, in particular from DE 10014832, is a device which consists in causing the hood to be raised by deploying an air bag. Nevertheless, during an impact, since the air bag deploys mainly under the hood, the pedestrian's head strikes the outside surface of the hood, which surface is rigid, and that can be dangerous even when an air bag is deployed underneath it.

OBJECTS AND SUMMARY OF THE INVENTION

The present invention seeks to provide protection for the fender-hood junction that is broad enough to support the head of the pedestrian, and also to protect the pedestrian from other rigid parts that are further away from the junction, such as the battery or the shock absorber cups.

To this end, the present invention provides the use of a fender and a hood presenting a fender-hood junction leaving predetermined clearance between an edge of the hood and an edge of the fender, in combination with an air bag for deploying outwards from the vehicle, so that while deploying the air bag deforms the fender and/or the hood so as to enlarge the clearance and make a passage between the edge of the hood and the edge of the fender.

Thus, with the invention, while the air bag is deploying, it exerts pressure against the fender or against the hood, which are suitably dimensioned to deform easily in such a manner as to enlarge the gap between the fender and the hood so as to allow the air bag to move out between them and protect a relatively large area.

A particular advantage of the invention is that it is adaptable to any type of vehicle, and in particular to a vehicle presenting too little space in the vicinity of the fender to receive a passive system for protecting pedestrians, such as a piece of padding, while nevertheless providing protection that is greater than that provided by such a passive system.

Optionally, the fender and the hood are used in combination with a plurality of air bags, thus enabling the protected area to be enlarged. Optionally, each air bag is of a different size depending on whether it is intended to protect an adult or a child.

The use of a fender and a hood in accordance with the invention may also include one or the other of the following characteristics:

the air bag is designed, on deploying, to cover the fender-hood junction; and the fender and the hood are used in combination with breakable holding means for connecting the fender to the structure of the vehicle.

The invention also provides a retaining means for retaining a motor vehicle front fender held in a normal position of use on the vehicle by holding means, said holding means being distinct from the retaining means and being suitable for releasing the fender on being subjected to a force greater than a predetermined threshold, said retaining means being suitable for retaining the fender that has been released by the holding means.

An advantage of this retaining means is that, while the air bag is deploying, it prevents the fender, or a portion of a fender, from being thrown outwards from the vehicle where it would run the risk of injuring a pedestrian, if any, or of falling dangerously into the middle of the road.

A retaining means of the invention may further comprise one or more of the following characteristics:

it comprises a cable fastened to the fender and to a structural part of the motor vehicle;

it comprises a sheath fastened to the fender and to a structural part of the motor vehicle;

the sheath is disposed around the air bag while it is in a rest position, this sheath having the advantage of isolating the bag from the outside medium;

the sheath is fastened close to a top edge of the fender in such a manner as to guide the air bag while it is deploying; and the sheath presents dimensions and strength that are sufficient to accompany the air bag while it is deploying so as to interposed between the bag and the edges of the fender and the hood in order to protect the bag.

The invention also provides a support for a motor vehicle front fender, the support connecting a top portion of the fender to the structure of the vehicle, the fender including an edge for lying adjacent to a hood leaving predetermined clearance relative to an edge of the hood, the support including a pivot enabling it to be connected to the structure in such a manner as to enable the clearance to be enlarged.

Optionally, the fender support is electrically controlled.

Optionally, the fender support is used in combination with an air bag arranged to push against the support.

The invention also provides a support for a motor vehicle front fender, the support connecting a top portion of the fender to the structure of the vehicle, the support including a housing for an air bag situated between the inside of the fender and the structure of the vehicle.

Optionally, the fender support includes, beside the structure, a plate serving as a bearing surface for the air bag while it is deploying.

Optionally, the fender support includes a zone suitable for breaking under thrust from the air bag in order to release the top portion of the fender.

The invention also provides a motor vehicle front fender comprising a bodywork skin delimiting the inside and the outside of the fender, being terminated by an edge for placing adjacent to a hood, the fender including a housing for an air bag situated inside the fender and in the vicinity of the edge.

This fender can be made of plastics material or of sheet metal.

An advantage of the plastics material fender consists in it being possible to mold shapes that are complex and thus obtain easily a configuration that is compatible with deploying the air bag.

A fender of the invention may further include one or more of the following characteristics:

it includes holding means for holding it on the vehicle in a normal in-use position, which means is made integrally with the skin and includes a zone that is suitable for breaking; and it includes a retaining means of the above-specified type.

The invention also provides a motor vehicle front fender module comprising a front fender and a fender support of the above-specified type.

Thus, by means of the fender module, in addition to complying with its strength and appearance characteristics, vehicle manufacturers can integrate a safety function in the fender module, without thereby changing the style of the vehicle.

Another advantage provided by the fender module consists in accelerating assembly of the front of the motor vehicle. Indeed, on an assembly line, the manufacturer does not waste time installing the air bag, since it is already integrated in the fender module.

The fender module may also include supports for functional members.

Finally, the invention provides a front hood for a motor vehicle, the hood including a deformable edge.

Optionally, the edge of the hood is deformed while the air bag is deploying.

Optionally, the hood is made of plastics material, of sheet metal, or of a hybrid metal and plastics material.

BRIEF DESCRIPTION OF THE DRAWINGS

The invention will be better understood on reading the following description given purely by way of example and made with reference to the accompanying drawings, in which:

FIG. 1 is a cross-section of a fender and a hood of a motor vehicle in a first embodiment of the invention;

FIG. 2 is a cross-section of the fender and the hood of FIG. 1, once the air bag has been deployed;

FIG. 3 is a cross-section of a motor vehicle fender and hood in a second embodiment of the invention;

FIG. 4 is a cross-section of a motor vehicle fender and hood in a third embodiment of the invention;

FIG. 5 is a cross-section of a motor vehicle fender and hood in a fourth embodiment of the invention, FIG. 6 is a cross-section of the FIG. 5 fender and hood once the air bag has been deployed;

FIG. 7 is a cross-section of a motor vehicle fender and hood in a fifth embodiment of the invention;

FIG. 8 is a cross-section of a motor vehicle fender and hood in a sixth embodiment of the invention;

FIG. 9 is a cross-section of a motor vehicle fender and hood in a seventh embodiment of the invention;

FIG. 10 is a cross-section of the FIG. 7 fender and hood after the air bag has been deployed;

FIG. 11 is a cross-section of a motor vehicle fender and hood in an eighth embodiment of the invention;

FIG. 12 is a cross-section of a motor vehicle fender and hood in a ninth embodiment of the invention;

MORE DETAILED DESCRIPTION

Figure 13:
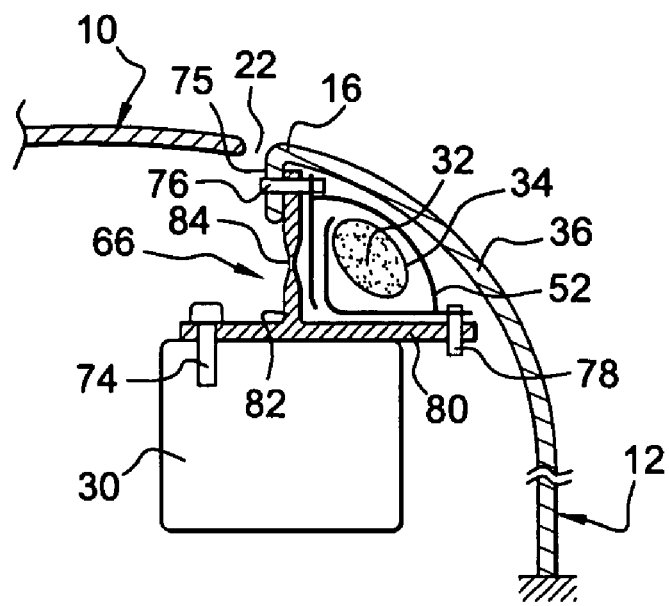
FIG. 13 is a cross-section of a motor vehicle fender and hood in a tenth embodiment of the invention.

FIG. 1 shows the front of a motor vehicle, including a hood 10 and a front fender 12 situated on the driver's left.

For a motor vehicle, the term "hood" is used to designate the bodywork part immediately adjacent to the top edge of the left or right front fender of the motor vehicle, and including a hood backing member. As a general rule, although not necessarily, the hood can be opened, at least in part, in order to give access to the engine or to a front trunk.

In the description below, the term "fusible link" is used to designate a link suitable for coming undone (breaking, releasing), and the term "permanent link" is used to designate a link that is not fusible.

The front fender 12 comprises an outer skin 14 that is intended to be seen from outside the motor vehicle. The skin 14 has a top edge 16 which is adjacent to the left-hand edge 18 of the hood, and a bottom edge 20 which is generally connected to the structure to the vehicle.

The edge 16 of the skin 14 and the edge 18 of the hood 10 are spaced apart by clearance 22.

Perpendicularly to its top edge 16 and on the inside of the front face, the front fender 12 includes a substantially vertical wall 24 constituting a fender rim serving firstly to fasten the front fender 12 to the structure of the vehicle, and secondly to stiffen the fender. The structure is fastened by means of a flange 26 at the end of the vertical wall 24, which is fastened to a structural part 30 by fastener means 28.

The term "structural part" 30 is used to mean any relatively rigid element connected to the main structure of the vehicle and suitable for supporting parts that are fitted to the motor vehicle, such as the fender 12, other bodywork parts, or functional members. For example, the structural part 30 could be the top left side-rail of the vehicle.

Because of the vertical wall 24 molded under the edge 16 of the fender 12, and because of the edge 18 of the hood 10 which may also include an inwardly-directed flange, the zone constituted by the edges 18 and 16, and by the clearance 22 can be particularly dangerous. In the event of an accident between a pedestrian and the front of the vehicle, the pedestrian's head can impact against it.

To damp this impact, the front face of the motor vehicle includes an inflatable cushion 32 folded inside a housing 34.

The inflatable cushion 32 is commonly referred to as an air bag. In the event of an impact, detector means (not shown) generally situated on the front shield of the vehicle, activate the air bag 32 in conventional manner. Once activated, the air bag 32 fills with gas so as to deploy towards the outside of the vehicle and cover a portion of the bodywork so as to damp the impact between said portion and the pedestrian.

In the embodiment of FIG. 1, the air bag 32 is fixed to the structural part 30 in such a manner that its base remains securely fastened to the vehicle, during the generally sudden deployment of the bag.

A part 31 is securely fastened to the structural part 30 so as to separate the portion of the front face including the air bag 32 from the remainder of the front face. By means of this part, as the bag deploys it is directed towards the clearance 22. This part 31 may be a functional member of the front panel. It is not essential for causing the bag to be deployed outwardly, since the bag could be guided by special stitching.

In FIG. 2, it can be seen that once the bag 32 is deployed, it covers the dangerous edges 18, 16. While it is being deployed, the air bag 32 exerts pressure against the various members surrounding it, including the hood 10, the part 31, and the wall 24 of the fender 12 which is made of plastics material. Since the fender 12 is more flexible than the hood, it presents smaller resistance than do the other members, and it is the first member to deform under said pressure. More precisely, the vertical wall 24 of the fender pivots about its flange 26, which is securely fastened to the structural part 30.

The fastener means 20 for fastening the bottom portion of the fender are permanent, and the deformed fender is retained on the structure of the vehicle by these means and by the wall 24.

In this embodiment, the hood 10 is stiffer than the fender 12 and it is not deformed.

Nevertheless, it can be seen in FIG. 3 that for a hood 11 presenting a zone of flexibility, a portion thereof, in particular its edge 18, can be deformed during deployment of the air bag 32.

In another embodiment shown in FIG. 4, the vehicle has a hood 13 and a fender 15 such that the fender 14 is stronger than the hood 13. Under such circumstances, during deployment of the air bag, it is the edge 18 of the hood 13 which deforms alone in order to enlarge the clearance 22.

FIG. 5 shows that the air bag 32 is situated inside the front fender 12. The housing 34 is thus situated under the fender 12 between the vertical wall 24 and the inside surface 36 of the fender 12. Optionally, the inside surface 36 may be covered in a protective film (not shown) for anticipating the risks of breaks at the surface of the fender 12.

The flange 26 of the vertical wall 24 is fastened to the structural part 30 by a fusible fastening means 38 that is strong enough to hold the fender but weak enough to give way when subjected to pressure from the air bag 32 during its deployment. The fusible fastener means 38 may be constituted by a rivet made of plastics material, for example.

While the air bag 32 is deploying, it exerts pressure on the inside surface 36 of the skin 14 and on the wall 24, and thus on the fastener means 38, to such an extent as to break them.

Thereafter, as can be seen in FIG. 6, the flange 26 of the fender 12 is separated from the structural part 30 so as to increase the clearance 22 and allow the air bag 32 to cover the end 18 of the hood 10. After its flange 26 has been released, the fender 12 deforms so as to allow the bag 32 to deploy. Nevertheless, because of the permanent fastening 20, the fender 12 remains held to the structure, thus avoiding any danger of it being thrown outwards from the vehicle.

In the embodiment of FIG. 7, it can be seen that the fender rim is constituted by a wall 25 including a zone of weakness 40 of reduced thickness in the vicinity of the edge 16 and is fastened to the structural part 30 by the permanent fastener 28.

In order to cause the zone of weakness 40 to break, reinforcing webs 42 and 44 are arranged inside the fender 12 in the vicinity of the edge 16 and the flange 26.

Thus, when the air bag 32 deploys inside the fender 12, it exerts pressure on the inside surface 36 and on the wall 25, in particular in the region of its zone of weakness 40. Under this pressure, and because of the weakness of the wall in its thin zone 40, the wall 25 breaks, thereby enabling the air bag 32 to move out from the vehicle by enlarging the clearance 22.

The top portion of the fender 12 is released by the zone of weakness 40 breaking, but it remains held to the motor vehicle by the fastening point 20.

In the embodiment shown in FIG. 8, the fender 12 is fastened to the structure of the vehicle by an arm 46 that is mounted to pivot round a pivot axis 48 that is secured to the structure of the vehicle. The arm 46 is rigidly fastened to the fender 12 at its edge 16, e.g. by adhesive, screw fastening, or welding. The arm 46 serves as means for fastening the fender to the structure of the vehicle.

The arm 46 is also connected to the structural part 30 by a bar 50 extending perpendicularly to the arm. The bar 50 is fastened in fusible manner to the part 30. In this embodiment, the air bag 32 is fastened to the structural part 30 between a vertical wall 51 thereof and the arm 46, above the bar 50.

In other embodiments (not shown), the bag 32 could equally well be fastened to the bar 50 or to the arm 46.

While the bag is deployed, it exerts pressure against the bar 50, against the arm 46, and against the inside face of the hood 10. As this pressure increases, the fusible fastening between the bar 50 and the part 30 releases, with the arm 46 being pushed outwards from the vehicle, causing the fender 12 of plastics material to be deformed. The bar pivots round the axis 48 and the clearance 22 between the edge 18 of the hood 10 and the edge 16 of the fender increases, leaving room for the air bag to pass through.

In another embodiment (not shown), the pivot arm 46 is a wall that pivots about a pivot axis connected to the structure, and the bar 50 is a horizontal wall.

In another embodiment (not shown), the pivot arm 46 is electrically controlled. Thus, on detecting an impact against a pedestrian, when a signal is delivered to the air bag for the purpose of triggering it, another signal automatically causes the arm 46 to pivot about the axis 48. Thus, the fender 12 is deformed not only by pressure from the air bag 32, but also by the movement of the arm 46. This facilitates deployment of the air bag 32 out from the vehicle.

In the embodiment shown in FIG. 9, the flange 26 of the vertical wall 24 is connected to the structural part 30 by a fusible fastener means 38. The housing 34 for the bag 32 is arranged between the wall 24 of the fender and its inside surface 36. In this embodiment, the housing 34 is no longer directly fastened to the structural part 30, but is wrapped in a sheath 52 and is fitted to the vehicle together with the fender 12.

This sheath 52 is made of a relatively flexible material, of aluminum sheet or of plastics material. It is fastened to the structural part 30 by a permanent fastener 54. It is also fastened to the vertical wall 24 of the fender 12 by a permanent fastener 56.

The sheath 52 surrounds the bag 32 in its rest position so that while is deploying, the sheath 52 lies between the bag and the sharp edges it will encounter in order to protect it. Thus, the ends of the sheath 52 are large enough to cover the edges 16 and 18.

Optionally, other permanent or fusible link means (adhesive, bonding, welding) between the sheath 52 and the surface 36 of the fender can be added in order to ensure that the assembly comprising the fender, the sheath, and the air bag acts as a unit.

While the air bag 32 is deploying, as can be seen in FIG. 10, it exerts pressure against the entire surface of the sheath 52 and pulls against the fusible fastener 38. Since the sheath 52 is stronger against this pressure than is the fastener 38, deployment of the air bag 32 causes the fastener 38 to break. Thereafter, the fender 12 deforms so that its vertical wall 24 is subjected to movement in an outward direction, enlarging the clearance 22 so that the air bag 32 covers the edge 18 of the hood and continues its deployment outwards from the vehicle.

While the bag is deploying, the sheath 52 becomes taut, thereby guiding the bag 32 towards the outside of the vehicle and preventing it from infiltrating towards the inside of the fender.

In addition, the sheath 52 enables the end 26 of the fender 12 to be retained on the motor vehicle. The fasteners 54 and 56 connected to the structural part 30 and to the wall 24 of the fender 12 are strong enough not to break while the bag 32 is deploying. Thus, the end 26 of the fender 12 is not completely free, thus avoiding the fender 12 or its end being thrown outwards, and thus avoiding it becoming a danger for other pedestrians.

In addition, the sheath 52 performs two protective functions. Firstly it protects the air bag 32 while it is deploying, by being large enough to cover the sharp edges that the air bag is going to meet, thereby preventing it from tearing. For this purpose, the sheath presses against the sharp edges while it is opening. Secondly, it protects the fender 12 during the deflagration due to the air bag being triggered. The air bag initially deploys inside the sheath, then it deforms the fender, thus ensuring that it does not break because of the deflagration. In addition, the sheath 52 protects the air bag 32 from its surroundings, while it is in its rest position.

In the embodiment of FIG. 11, the sheath 52 is no longer fastened to the structural part 30 but is instead fastened to the fender rim, and more precisely to a wall 27, by means of permanent fasteners 58 and 60. The wall 27 fixed to the structural part 30 by the permanent fastener 28 includes a zone of weakness of reduced thickness in a zone 62 situated between the two permanent fasteners 58 and 60.

During deployment of the bag 32, it exerts pressure against the entire sheath 52, and also against a portion of the wall 27, and it pulls on the zone of weakness 62. Under the effect of the pressure, this zone 62 breaks so as to allow the bag 32 to pass through and the bag then enlarges the clearance 22 so as to deploy outwards from the vehicle. Since the ends of the sheath 52 overlap while the air bag is at rest, they surrounded it while it is deploying so as to protect it from the outside.

In this embodiment also, the sheath 52 constitutes means for guiding the air bag while it is deploying, and also means for retaining the free end of the fender 12 once the wall 27 has broken.

In another embodiment (not shown), the sheath 52 is replaced by a cable likewise fastened to the fender and possibly also to the structural part 30. Under such circumstances, the cable no longer performs the guidance function provided by the sheath 52, and serves solely to provide a function of holding the end of the fender 12 to the structure of the vehicle.

In the embodiments of FIGS. 12 and 13, the fender 12 is connected to the structural part 30 via a respective fender support 64 or 66. In addition to having a support function, the fender supports 64 and 66 have a function of pressing against and guiding the air bag 32.

In these two embodiments, the sheath 52 is always disposed around the air bag 32. It is fastened to the supports 64, 66 and to the structure 30 by fastener tabs. By means of these tabs, the housing 34, and thus also the bag 32 while it is deploying, do not come into contact with the means for fastening the sheath 52 to the vehicle, thus avoiding any risk of the bag 32 tearing.

In FIG. 12, the support 64 is a plate securely fastened to the structural part 30. The flange 26 of the fender 12 is fastened to the support 26 by a fusible fastener 68. A fastener tab of the sheath 52 is securely fastened to the vertical wall 24 by a fastener 56. A second fastener tab of the sheath 52 is fastened to the reinforcement 64 by a permanent fastener 72.

During the deployment of the air bag 32, it exerts pressure against the entire sheath 52 and indirectly against the fusible fastener means 68 which breaks, thereby opening up a passage for the bag 32 so that it can deploy towards the outside by enlarging the clearance 22.

The support 66 of FIG. 13 is fastened to the structural part 30 by means of a permanent fastener 74. In this embodiment, the fender 12 does not have an internal vertical wall, but only a flange 75 extending beneath the edge 16. The support 56 is also fastened to the flange 75 by a fastener means 76 that is likewise permanent.

The support 66 comprises a plate 80 arranged directly on the structural part 30 and further comprises a vertical wall 82 perpendicular to said plate 80, which vertical wall extends upwards from the plate 80 towards the flange 75. This vertical wall 82 includes a zone of weakness 84 where the thickness of its plastics material is smaller than over the remainder of the wall 82.

A tab for fastening the sheath 52 is secured to said vertical wall 82 by the permanent fastener means 76, and another fastener tab is secured to the plate 80 by a permanent fastener 78.

While the bag 32 is deploying, it exerts pressure against the entire surface of the sheath 52 and also against the zone of weakness 84. This zone 84 breaks, leaving a passage for the bag 32 to deploy outwards from the vehicle by increasing the clearance 22. The remaining portion of the wall 82 serves to guide the bag 32 outwards and to prevent the bag from inflating under the hood 10.

An advantage of the supports 64 and 66 consists in them constituting a support the housing 34 of the bag 32. Thus, while the vehicle is being assembled, the bag 32, the housing 34, and the sheath 52 are fastened directly to the support 64 or 66 which is subsequently fastened to the fender 12 by means of the fasteners 68 and 76. Thereafter, the fender 12 including the bag 32 is assembled on the vehicle, in particular onto the structural part 30. This method thus reduces the number of assembly operations that need to be performed on the structure of the vehicle, thereby reducing the time it spends on the assembly line.

Furthermore, the fender 12 having such supports 64 or 66 together with the air bag can constitute a fender module having likewise fitted thereto other supports for functional members, such as a support for a windshield washer unit, a headlight support, etc. The fender module when subsequently fastened to the motor vehicle has the advantage of constituting a "ready-to-assemble" module for the vehicle manufacturer.

Figure 14:
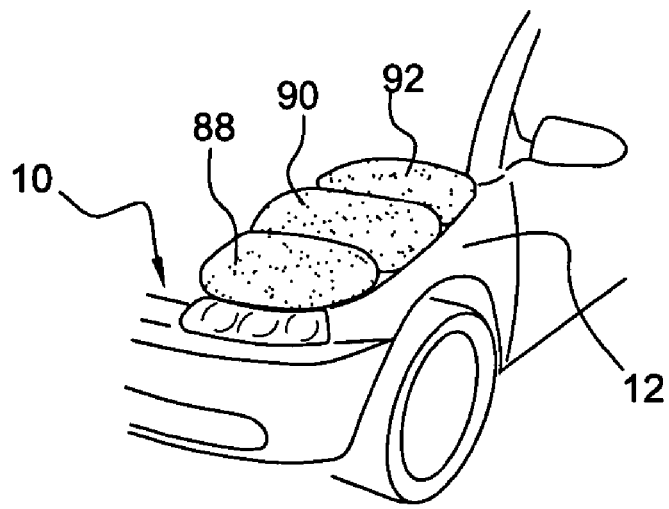
FIG. 14 is a perspective diagram of a motor vehicle fender and hood in an eleventh embodiment of the invention.

Finally, in the embodiment of FIG. 14, it can be seen that the vehicle is fitted with three air bags (88, 90, 92).

Having these air bags juxtaposed enables a much larger area of the fender-hood junction to be covered, and in particular serves to cover other dangerous zones such as the cross-member of the front panel, the shock absorber cups, the battery, the headlight supports, and the scuttle region which includes the windshield wiper shafts.

In an embodiment (not shown), the air bags are of different dimensions depending on their positions on the vehicle, and more precisely their positions along the fender-hood junction. It is known that the fender-hood junction region situated close to the bumper needs to protect a pedestrian of child size, whereas the zone situated further back towards the windshield is required to protect a pedestrian of adult size. Consequently, the bag 88 can be smaller or more flexible for protecting a child, while the bag 92 can be a bag that is stiffer and larger in size for protecting an adult. It should be observed that this characteristic can be present at the front of a vehicle without it being necessary for the air bag to enlarge the clearance left between the hood and the fender.

Finally, it should be observed that the invention is not limited to the embodiments described above.

What is claimed is:

1. At the front of a motor vehicle, the use of an assembly consisting of a fender and a hood, the fender and hood defining a junction leaving a predetermined clearance between an edge of the hood and an edge of the fender, in combination with an air bag for deploying outwards from the vehicle, so that while deploying the air bag deforms the assembly so as to enlarge the clearance and make a passage between the edge of the hood and the edge of the fender.

2. The use of a fender and a hood according to claim 1, in combination with a plurality of air bags.

3. The use of a fender and a hood according to claim 2, wherein each air bag is of different size depending on a size of a pedestrian the air bag is intended to protect.

4. The use of a fender and a hood according to claim 1, wherein the air bag is designed, on deploying, to cover the fender-hood junction.

5. The use of a fender and a hood according to claim 1, in combination with fusible holding means for connecting the fender to the structure of the vehicle.

* * * * *